US012735220B2

(12) United States Patent
Moyzischewitz

(10) Patent No.: US 12,735,220 B2
(45) Date of Patent: Sep. 15, 2026

(54) CUTTING TOOL AND METHOD FOR SINGLE-HANDED DESTRUCTIVE RELEASE OF A CABLE TIE

(71) Applicant: Hellermann Tyton GmbH & Co. KG, Tornesch (DE)

(72) Inventor: Marcon Moyzischewitz, Wedel (DE)

(73) Assignee: Hellermann Tyton GmbH, Tornesch (DE)

( * ) Notice: Subject to any disclaimer, the term of this patent is extended or adjusted under 35 U.S.C. 154(b) by 320 days.

(21) Appl. No.: 18/421,732

(22) Filed: Jan. 24, 2024

(65) Prior Publication Data

US 2024/0246711 A1 Jul. 25, 2024

(30) Foreign Application Priority Data

Jan. 25, 2023 (DE) ........................ 202023100352.4

(51) Int. Cl.
*B65B 69/00* (2006.01)
*B26B 27/00* (2006.01)

(52) U.S. Cl.
CPC .......... *B65B 69/0025* (2013.01); *B26B 27/00* (2013.01)

(58) Field of Classification Search
None
See application file for complete search history.

(56) References Cited

U.S. PATENT DOCUMENTS 4,610,067 A 9/1986 Hara
4,793,385 A 12/1988 Dyer et al.
4,997,011 A 3/1991 Dyer et al.
5,492,156 A 2/1996 Dyer et al.
5,769,133 A 6/1998 Dyer et al.
5,921,290 A 7/1999 Dyer et al.
6,425,183 B2 * 7/2002 Lemmens .............. B23D 27/02 30/186

(Continued)

FOREIGN PATENT DOCUMENTS

DE 4425908 A1 1/1995
DE 102008043692 B4 7/2010

(Continued)

OTHER PUBLICATIONS

English translation of EP 2 335 880 A2, dated Feb. 22, 2011.*

(Continued)

*Primary Examiner* — Hwei-Siu C Payer
(74) *Attorney, Agent, or Firm* — Colby Nipper PLLC

(57) ABSTRACT

The disclosure relates to a cutting tool for destructively releasing a cable tie, comprising a cutting unit for cutting into the cable tie to be released; a housing unit having a handle element for holding the cutting tool and an end face to be placed on the cable tie to be loosened during intended use with a path limiting unit, which is designed to limit a path covered by a blade element of the cutting unit when cutting the cable tie to be released in such a way that the cable tie is cut but not cut through by the cutting unit when the cutting tool is used as intended in order to provide an improved cutting tool which overcomes the problems known from the prior art, in particular eliminates injury to the bundling good and simplifies the destructive release of a cable tie closed around a cable bundling good.

20 Claims, 4 Drawing Sheets

(56) References Cited

U.S. PATENT DOCUMENTS

| | | | | |
|---|---|---|---|---|
| 8,365,418 | B2 * | 2/2013 | Tomasetti | B26B 17/00 30/286 |
| 10,035,246 | B2 * | 7/2018 | Coffland | B25B 7/04 |
| 11,407,131 | B2 * | 8/2022 | Bader | B26B 25/007 |
| 2002/0108664 | A1 | 8/2002 | Kurmis | |
| 2002/0108665 | A1 | 8/2002 | Thieme | |
| 2002/0108666 | A1 | 8/2002 | Kurmis | |
| 2002/0108667 | A1 | 8/2002 | Thieme | |
| 2002/0108668 | A1 | 8/2002 | Thieme | |
| 2006/0037661 | A1 * | 2/2006 | Lueschen | B65B 13/027 140/123.6 |
| 2007/0277383 | A1 | 12/2007 | Tomasetti et al. | |
| 2013/0167970 | A1 | 7/2013 | Dyer | |
| 2015/0151862 | A1 | 6/2015 | Kitago | |
| 2015/0239588 | A1 | 8/2015 | Kitago | |
| 2016/0167813 | A1 | 6/2016 | Myers | |
| 2016/0230907 | A1 | 8/2016 | Kitago | |
| 2017/0057674 | A1 | 3/2017 | Myers | |
| 2019/0127095 | A1 | 5/2019 | Kitago | |
| 2019/0210749 | A1 | 7/2019 | Kitago | |
| 2023/0128208 | A1 * | 4/2023 | Dyer | B65B 13/027 140/56 |
| 2023/0219245 | A1 * | 7/2023 | Liao | B26B 13/06 30/165 |
| 2024/0246711 | A1 * | 7/2024 | Moyzischewitz | B26B 17/00 |
| 2024/0286781 | A1 | 8/2024 | Masuch | |

FOREIGN PATENT DOCUMENTS

| | | | |
|---|---|---|---|
| DE | 102013222924 | | 5/2015 |
| DE | 102018110184 | A1 | 10/2019 |
| EP | 1231142 | A1 | 8/2002 |
| EP | 2335880 | A2 | 6/2011 |
| JP | H10250703 | A | 9/1998 |
| JP | 2015500089 | A | 1/2015 |
| JP | 2018064663 | A | 4/2018 |
| JP | 2018172175 | A | 11/2018 |
| JP | 2019116307 | A | 7/2019 |
| JP | 2021517542 | A | 7/2021 |
| KR | 20010070177 | A | 7/2001 |

OTHER PUBLICATIONS

"Evo Cut", HellermannTyton Product Catalog, Dec. 2021, 1 page.

"HellermannTyton Evo Cut Launch Flyer", Retrieved at: https://www.mouser.com/pdfDocs/LITPD380EVOcut_LaunchFlyer_v5.pdf—on Jan. 23, 2024, 2 pages.

"Extended European Search Report", EP Application No. 24158647.8, Aug. 8, 2024, 8 pages.

"Extended European Search Report", EP Application No. 24153334.8, Oct. 17, 2024, 9 pages.

"Foreign Office Action", JP Application No. 2024-008760, Feb. 4, 2025, 8 pages.

"Foreign Office Action", JP Application No. 2024-027396, Dec. 16, 2024, 4 pages.

"Foreign Office Action", KR Application No. 10-2024-0011877, Jan. 5, 2026, 11 pages.

"Foreign Office Action", KR Application No. 10-2024-0028006, Dec. 12, 2025, 6 pages.

"Restriction Requirement", U.S. Appl. No. 18/440,525, filed Mar. 25, 2026, 5 pages.

"Non-Final Office Action", U.S. Appl. No. 18/440,525, filed Jun. 25, 2026, 13 pages.

* cited by examiner

CUTTING TOOL AND METHOD FOR SINGLE-HANDED DESTRUCTIVE RELEASE OF A CABLE TIE

INCORPORATION BY REFERENCE

This application claims priority to German Patent Application No. DE202023100352.4, filed Jan. 25, 2023, the disclosure of which is incorporated by reference in its entirety.

FIELD

The disclosure relates to a cutting tool for destructively releasing a cable tie closed around a bundling good, with a cutting unit for cutting into the cable tie to be released and with a housing unit which has a handle element for holding the cutting tool and as well as an end face to be placed on the cable tie to be released during intended use.

BACKGROUND

In many applications, cable ties that have already been closed around a bundling good must be undone or released. This is usually done by destroying the cable tie, e.g., destructively. Simple tools such as side cutters can be used for destructive release. The problem here, however, is that the bundling good can easily be damaged if such simple cutting tools are used inaccurately, which results in high follow-up costs and must therefore be avoided. Accordingly, cutting tools specially developed for the destructive release of closed cable ties, such as the EVOcut™ cutting tool from HellermannTyton®, are also known. A pair of blade elements is recessed in a housing, an end face of which is placed against the cable tie to be released, respectively the tied material, and these shear off the cable tie as intended when actuated. When this cutting tool is used, the cable tie, but not the bundling good, is picked up by the housing of the cutting tool and cut by the blade elements. Here, too, however, in the case of a particularly thin bundling good or cables with very thin-walled insulation, damage to the bundling good, respectively cables, may occur under certain circumstances. Moreover, after cutting, the cable tie usually disintegrates into at least two parts, which then have to be secured or picked up separately.

SUMMARY

Accordingly, the cutting tool and method for single-handed destructive release of a cable tie are based on the problem of providing an improved cutting tool which overcomes the problems known from the prior art, in particular eliminates injury to the bundling good and simplifies the destructive release of a cable tie closed around a cable bundling good.

One aspect relates to a cutting tool for the, preferably one-handed, destructive release of a cable tie closed around a bundling good. The cutting tool is thus particularly suitable for loosening/releasing/destroying the closed cable tie with only one hand. Thereby, the cutting tool is preferably adapted to a cable tie of a predetermined type and is thus designed for loosening cable ties of one or more predetermined types, in particular cable tie types with predetermined dimensions, in particular predetermined maximum dimensions. The predetermined dimensions or maximum dimensions relate in particular to a cable tie head and/or a cable tie strap width and/or a cable tie strap thickness of the cable tie.

The cutting tool has a cutting unit for cutting into the cable tie to be released and a housing unit. The housing unit has a handle element for holding, in particular also for operating the cutting tool, as well as an end face to be placed on the cable tie to be released and/or the bundling good when the cutting tool is used as intended.

The cutting tool also has a path-limiting unit which is designed to limit a path covered by a first blade element of the cutting unit through the cable tie to be released when cutting the cable tie to be released in such a way that the cable tie is cut by the cutting unit but not completely cut through when the cutting tool is used as intended. In order to ensure this, the blade element in the cutting tool can be assigned a counter-bearing, whether by means of a further second blade element or another counter-bearing element, which may for example be formed by the housing unit, in particular with the end face of the housing. One possibility is that an adapter element, as part of the housing unit, form the end face at a predetermined distance from the blade element(s), as described in more detail below.

Thus, the path-limiting unit can specify a predetermined distance (e.g., a minimum distance) between the first blade element and the respective counter bearing, e.g., the end face of the housing, which is not underrun when cutting the cable tie. There, the predetermined distance (e.g., a minimum distance), which can also be referred to as the smallest possible distance, is greater than zero. It may be, for instance, at least 0.5 mm or at least 0.8 mm or at least 1 mm. Therein, the minimum distance may be measured in an area which cuts the cable tie when used as intended. Accordingly, when the cutting tool is used as intended, the cutting takes place in such a way that after cutting and thus after destructive release of the cable tie, the released cable tie is destroyed but is still a coherent or connected part, e.g., does not disintegrate into two or more parts even it is, for instance, the cable tie head that is cut. Supplementary, as further described below, the path limiting unit can also limit the path of the further second blade element of the cutting unit if there is one. The blade element(s) is (are) arranged to be movable relative to the housing unit, which comprises the end face.

This has the advantage that the cable tie does not disintegrate into several parts after it has been released, but can be removed from the tie material as a single part and disposed of. Advantageously, this is also the case when the cutting tool is used to cut the cable tie head, which is usually particularly accessible and, when conventional cutting tools are used, is completely separated from the rest of the cable tie, which then results in at least two, and often three, loose parts into which the cable tie disintegrates when it is released destructively. In the process, the cable tie can be jammed in the cutting tool, which means that the cutting tool described is also suitable for releasing the cable tie with one hand.

In particular, it can be provided here that the (first) blade element and/or the further (second) blade element have a respective end face which is arranged offset from the end face of the housing (that is to be placed on the cable tie to be released during the intended use) inwardly in a direction into the cutting tool with said predetermined (minimum) distance from the end face. Consequently, the end face of the housing acts as said counter bearing, e.g., the end face is or comprises or is part of the path-limiting unit. Due to the blade element(s) being arranged at a distance from the end face in the housing unit in an inwards direction, the end face is, when the cable tie is cut, arranged directly on (e.g., in mechanical contact with) the bundling good, whereas the blade element(s) is arranged at the predetermined distance from the bundling good. Since in all practical applications, the cable tie is pulled tightly around the bundling good, the predetermined distance also defines the thickness of the cable tie remaining after the cutting. This has the advantage, that the path limiting can be realised in a simple and safe way. Since the blade elements are offset inwards with respect to the end face, they are covered by the housing unit and unlikely to damage or injure unintendedly. The end face of the housing unit can be easily provided in different shapes and forms, e.g., by one or more adapter elements which may be configured to be used as a cap to existing cutting tools such as the HellermannTyton® EvoCut™. So the cutting tool can be optimized easily for different applications with different types of cable ties, fostering flexible application of the concept of partly cutting through cable ties for loosening them.

In a further aspect, the end face has a receiving region for a cable tie head of a predetermined design and, in particular, also for a cable tie strap attachment to the cable tie head of the cable tie to be released. The cable tie strap attachment designates a partial area of the cable tie strap adjoining the cable tie head. In particular, the receiving region is designed to completely receive the cable tie head. This can be done, for example, in such a way that, when used as intended, a side of the cable tie head that is further away from the grip element in a direction perpendicular to the end face, e.g., an inner side of the cable tie head that rests against or faces the bundling good, is arranged flush with the end face. This has the advantage that it can be ensured that the cutting tool is applied to the cable tie or the cable tie head in an ideal manner, and accordingly contributes to a particularly reliable operation of the cutting tool.

In particular, the receiving region may be oriented such that the path traversed by the blade element (or blade elements) during cutting through the cable tie is transverse to a plane in which the closed cable tie strap of the cable tie to be released extends (e.g., the path runs transverse to a cross-sectional plane of the bundling good) and/or transverse to a plane in which the inner side of the cable tie head extends. This has the advantage that the blade element cuts the cable tie head in a manner that is ideal for releasing an engagement of the cable tie in the cable tie head without substantially damaging the cable tie strap.

In a further aspect, it is provided that the cutting unit comprises the further second blade element already mentioned above, which is designed to be moved counter to the one or first blade element during cutting. The path-limiting unit is also designed to limit a path through the cable tie to be released covered by the further blade element of the cutting unit during cutting of the cable tie to be released. Therein, the cable tie, in particular the cable tie head, further is only cut by the cutting unit, but not completely cut through. Expressed another way, the path-limiting unit is configured for limiting a path covered by the blade element of the cutting unit when cutting the cable tie to be released such that the cable tie is partially cut but not entirely cut through by the cutting unit. This has the advantage that the functionality of the cutting unit is improved. Moreover, this also makes it possible to manufacture the cutting tool starting from an already known cutting tool with two counter-moving blade elements, which does not feature a path-limiting function, which on the one hand simplifies the production process, and on the other hand also makes it possible for the respective operator to already be experienced in the use of a cutting tool with similar shape. This also simplifies the destructive release of the cable tie.

In another aspect, it is provided that the path-limiting unit is arranged on the handle element or on an actuating component for the cutting unit that is movable relative to the handle element. The path-limiting unit may be in the form of a stop part of the handle element, for example, or comprise such a stop part. This has the advantage that the path-limiting unit can be implemented particularly simply, in particular because typically the paths are greatest in the region of the actuating component or the handle element, so that the path covered by the blade element can be specified particularly precisely by the design of the path-limiting unit.

In a further aspect, it is provided that the housing unit has an adapter element which can be replaced or exchanged, preferably without tools, and which predetermines at least a subregion of a geometry of the receiving region, wherein in particular a second subregion of the geometry of the receiving region is predetermined by the remaining housing unit. In particular, first and second subregions thereby form the geometry of the receiving region. In an aspect, the adapter element predetermines the geometry of the receiving area as whole, e.g., the complete geometry of the receiving area is predetermined by the adapter element. The geometry of the receiving may be defined by limiting surfaces that limit the movement in one or two dimensions along a main extension plane of the end face by abutting to part of the cable tie received by the receiving region. Thus, the limiting surfaces are oriented at least essentially perpendicular to the main extension plane of the end face.

In addition or as an alternative, the adapter element comprises at least parts of the end face, e.g., parts of the end face or the end face, and specifies a relative position of the blade element(s) with respect to the end face. So, in particular, the adapter element specifies/determines the predetermined distance from end face of the housing to the blade element (e.g., the end face of the blade element).

This has the advantage that an existing cutting tool can be converted or adapted in the sense of the functionality of the cutting described here, or conversely the cutting tool described here can be adapted to the cutting of the cable tie in the area of the cable tie strap by replacing the adapter element, which predefines the first partial area of the geometry of the receiving region for the cable tie head here, with another adapter element. This is advantageous, for example, if the cable tie head is located in an inaccessible position.

Accordingly, in a further aspect, it can be provided that the path-limiting unit, e.g., the adapter unit, can be configured non-destructively, in particular by folding, from a limit configuration, in which the path of the blade element or blade elements is limited when cutting the cable tie to be released, in such a way that the cable tie is cut but not cut through by the cutting unit when the cutting tool is used as intended, into a release configuration, in which the path of the blade element or blade elements during cutting of the cable tie to be released is released in such a way that the cable tie can be cut through by the cutting unit during intended use of the cutting tool. This has the advantage that a slight modification of the cutting tool opens up the known through-cutting of the cable tie as a fallback option, for example if the cable tie head is not accessible.

In a further aspect, it is provided that the one and/or the further blade element do not protrude beyond the end face of the housing. This has the advantage that the risk of damage to the bundling good is reduced when cutting the cable tie.

A further aspect relates to a cutting tool system having a cutting tool according to one of the described aspects and having a plurality of different interchangeable, preferably tool-free interchangeable, adapter elements. The adapter elements may each be of different design at least in the respective first subregion of the geometry of the receiving region, e.g., in the first subregion of the geometry or, when they predetermine the geometry of the receiving region as a whole, be of different design in the geometry of the receiving region as a whole. Then the geometry of the receiving region is adapted by the respective adapter elements in each case to cable tie heads of different predetermined design, in particular different edge dimensions. In addition or as an alternative, the plurality of different interchangeable adapter elements may each specify a different relative position of the blade elements with respect to the end face and/or form different geometries of the receiving area, either alone or in interaction with the rest of the housing. This has the advantage that the cutting tool can be optimized in a simple manner for reliably cutting different cable tie heads in each case.

In an aspect of the cutting tool system, at least one of the interchangeable adapter elements forms a geometry of the receiving region alone, e.g., the receiving area is formed at least essentially without other parts of the housing unit.

Another aspect relates to a method for single-handedly releasing a cable tie closed around a bundling good comprising a plurality of method steps. One method step is a placing of a cutting tool onto the cable tie to be released by an operating hand of an operator, in particular an end face of the cutting tool. A further step is an actuation of an actuation component of a cutting unit of the cutting tool by the operating hand, and thus a cutting of the cable tie to be released. This is followed by automatically limiting a path covered or traveled by a blade member of the cutting unit through the cable tie to be released during cutting such that the cable tie is cut by the cutting unit, but not completely cut through, by a path limiting unit of the cutting tool. In this case, holding of the actuating component by the operator's hand may be performed with automatic jamming of the cut cable tie in the cutting tool by the cutting unit, and removal of the cutting tool with the jammed cable tie from the bundling good while the actuating component is held by the operator's hand.

Thereby, advantages and advantageous aspects of the method correspond to advantages and advantageous aspects of the cutting tool and vice versa.

The features and combinations of features mentioned above in the description, also in the introductory part, as well as the features and combinations of features mentioned below in the description of the figures and/or shown alone in the figures are usable not only in the respective combination indicated, but also in other combinations without leaving the scope of the invention. Thus, aspects are also to be regarded as encompassed and disclosed in this disclosure which are not explicitly shown and explained in the figures, but which arise from the explained aspects and can be generated by separate combinations of features. Aspects and combinations of features are also to be regarded as disclosed which thus do not have all the features of an originally formulated independent claim. Furthermore, aspects and combinations of features are to be regarded as disclosed, in particular by the aspects set forth above, which go beyond or deviate from the combinations of features set forth in the recitations of the claims.

In the context of the present disclosure, "vertical/parallel" may be understood as "at least substantially vertical/parallel", e.g., "vertical/parallel" or "substantially vertical/parallel", e.g., vertical/parallel except for a predetermined deviation. The predetermined deviation can, for example, be at most 15°, preferably at most 5°, particularly preferably at most 3°. Accordingly, "oppositely oriented" may be understood in the context of the present disclosure as "at least substantially oppositely oriented" e.g., "at least substantially anti-parallel oriented". The limitation "substantially" may also refer to a percentage predetermined maximum permissible deviation, for example at most 15%, preferably at most 5%, particularly preferably at most 3%.

BRIEF DESCRIPTION OF THE DRAWINGS

Example aspects are described in more detail below with reference to schematic drawings. Thereby.

In the various figures, identical or functionally identical elements are provided with the same reference signs.

DETAILED DESCRIPTION

Figure 1:
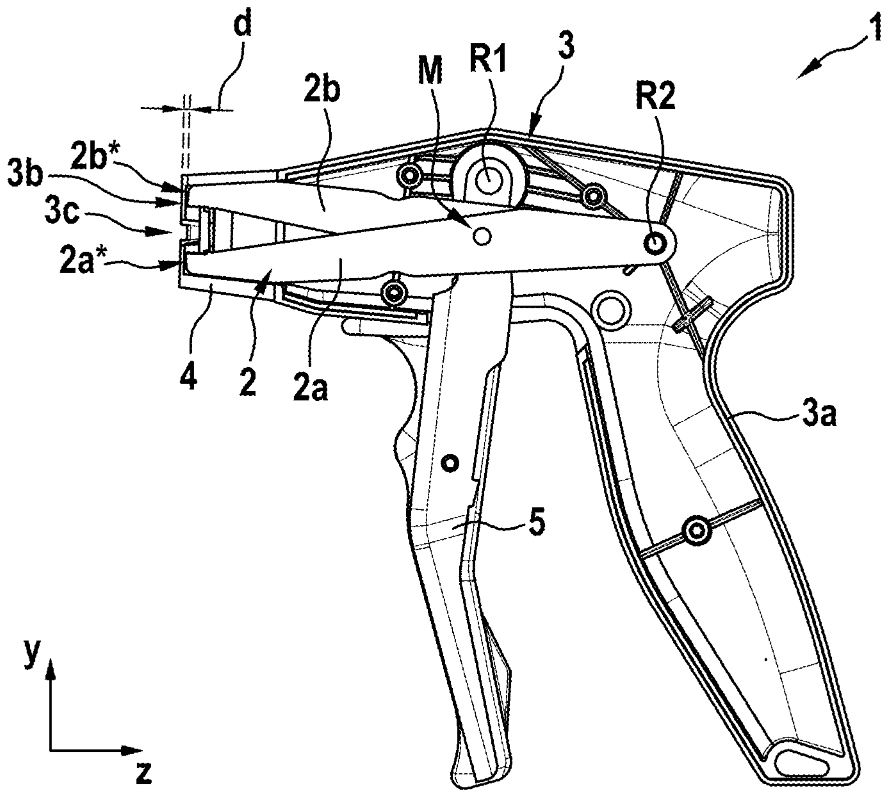
FIG. 1 shows an example aspect of a cutting tool in neutral position as a sectional view.

FIG. 1 shows an example aspect of a cutting tool 1 for destructively releasing, e.g., destructively undoing a cable tie. The cutting tool 1 has a cutting unit 2 for cutting into the cable tie 6 (illustrated in FIG. 3) to be released. The cutting unit 2 comprises at least one, in this case two blade elements 2*a*, 2*b*. The cutting tool 1 also has a housing unit 3 with a handle element 3*a* for holding the cutting tool 1 and with an end face 3*b* to be placed on the cable tie to be released during intended use. The cutting tool 1 also has a path-limiting unit 4, which is designed to limit a path through the cable tie covered, here in the z-direction, by a blade element 2*a*, 2*b* of the cutting unit 2 when cutting the cable tie 6 to be released in such a way that the cable tie is cut, but not cut through, by the cutting unit 2 when the cutting tool 1 is used as intended.

In the aspect shown, an actuating component 5 for the cutting unit 2, respectively the cutting tool 1, is movable relative to the handle element 3*a*. Movement of the actuation component 5 towards the handle element 3*a*, e.g., presently in the z-direction, causes, in a known manner via a mechanism M with here two axes of rotation R1, R2, an opposing movement of the two blade elements 2*a*, 2*b* presently in y-direction and thus, with the cable tie head 6*a* (illustrated in FIG. 6) located at the end face 3*b*, here in a receiving region 3*c*, a cutting of the cable tie head 6*a*.

In the shown aspect, the end face 3*b* protrudes over end faces 2*a, 2*b of the blade elements 2*a*, 2*b*. Thus the end faces 2*a, 2*b are offset inwardly, e.g., in the z-direction here. The distance d between is measured in that direction inwards into the cutting tool 1, perpendicular to a main extension plane (e.g., y-z-plane here) of the end face 3*b*. Thus the end face 3*b* in the present case is part of the path limiting unit 4. The predetermined distance d may at least essentially be determined by a material thickness of the path limiting unit 4 in the area of the end face 3*b*. In the present example, with the end faces 2*a, 2*b essentially abutting an inner side 3*b*' (illustrated in FIG. 4) of the path limiting unit 4 opposed to the end face 3*b*.

Figure 2:
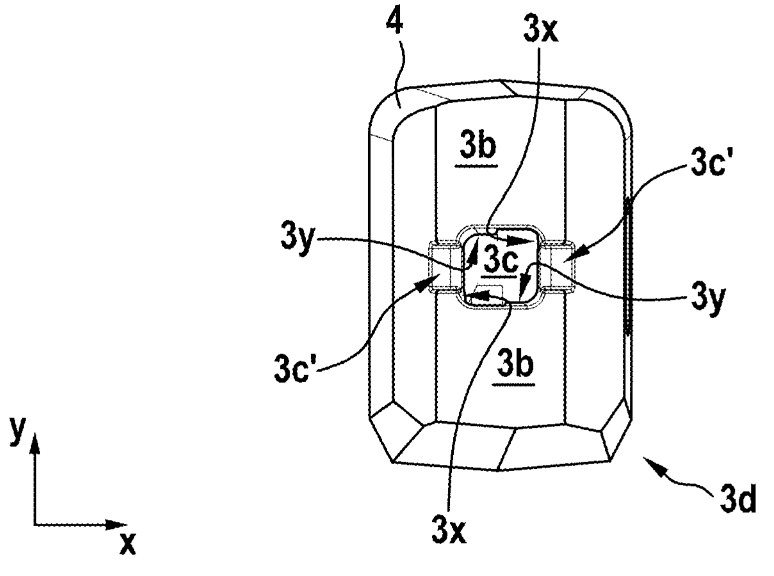
FIG. 2 shows the end face of the aspect shown in FIG. 1 as a top view.

In FIG. 2, the cutting tool 1 is shown in a frontal view of the end face 3*b*, with components of the cutting tool 1 lying further in the drawing plane being hidden for reasons of clarity. The dimensions of the receiving region 3*c* are adapted to cable tie heads 6*a* of a predetermined type, for example a type T18, so that the cable tie heads 6*a* of the respective types can be received by the receiving region 3*c*. In the present aspect, this is done to such an extent that an inner side 6*a (illustrated in FIG. 4) of the cable tie head 6***a* to be cut, which faces the bundling good, runs in a plane with the end face 3*b* when used as intended. Accordingly, by applying the end face 3*b* to the respective bundling good held by the cable tie 6, the cable tie head 6*a* can be received in the receptacle, e.g., the receiving region 3*c*. In the present case, the receptacle is also formed for receiving the cable tie strap in corresponding areas 3*c*', so that in the present case of intended use the cable tie strap 6*b* (illustrated in FIG. 6) runs in the x-direction.

The path through the cable tie 6 covered here by the blade elements 2*a*, 2*b* in each case runs in the y-z-plane, the receiving region 3*c* is thus oriented in the present case in such a way that the path through the cable tie 6 covered by the blade elements 2*a*, 2*b* runs transversely to a plane in which the closed cable tie strap of the cable tie to be released runs, here the xz-plane, and to the plane in which the inside 6*a of the cable tie head 6***a* runs, here the xy-plane.

Presently, the geometry of the receiving region for the cable tie head 6*a* consists of two sets of opposing limiting surfaces 3*x*, 3*y*. Therein, one pair of limiting surfaces 3*x* limit movement of the cable tie head 6*a* along the plane of the end face 3*b* (e.g., x-y-plane here) in one dimension (e.g., x-direction here), the other pair of limiting surfaces 3*y* in another dimension (e.g., y-direction here). Alternatively or in addition, the areas 3*c*' may also be configured for receiving a cable tie strap 6*b*, with a corresponding set of opposing limiting surfaces 3*y*' (illustrated in FIG. 5) limiting the movement of a cable tie band 6*b* received in the areas 3*c*' along the plane of the end face 3*b* in one dimension (e.g., y-direction here).

Figure 3:
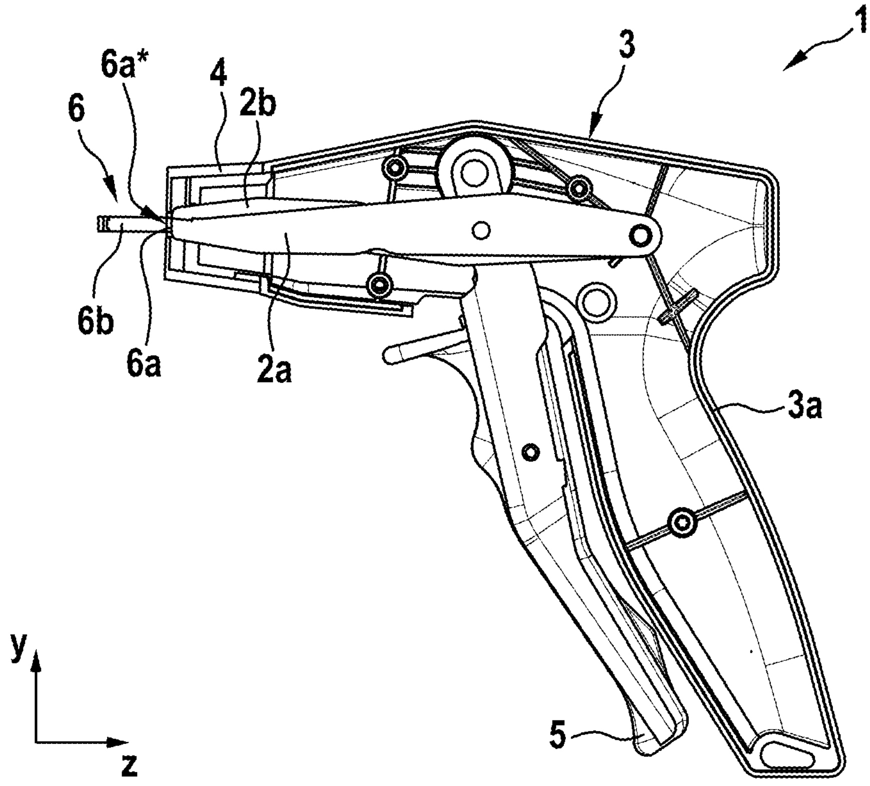
FIG. 3 shows the cutting tool from FIG. 1 during its operation as a sectional view.

Accordingly, in FIG. 3, the cutting tool 1 from FIG. 1 is shown when the actuating component 5 is actuated. The path-limiting unit 4, here arranged the handle element 3*a* like a cap, comes into contact with the bundling good (not shown, running along the y-direction) and thus limits a path 7 (illustrated in FIG. 5) of the blade units 2*a*, 2*b* through the cable tie head 6*a*, here in the negative z-direction, since the end face 3*b* is flush with an inner side 6*a of the cable tie head 6. Since the path-limiting unit 4 can be removed from the handle element 3***a* in a non-destructive manner in the present case, it can, for example be replaced by an adapter element 3*d* as alternative path-limiting unit 4.

Figure 4:
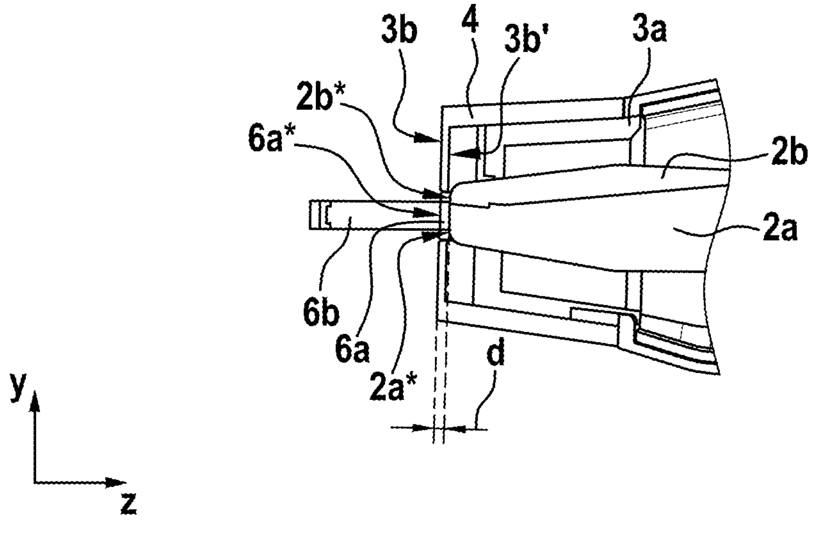
FIG. 4 shows a detail from FIG. 3.

FIG. 4 shows enlarged the area of the end face 3*b* from FIG. 3. Since the distance d is greater than 0 as shown, the cable tie head 6*a* is also not completely separated into two loose parts when cut, but into two parts which are still partially connected. However, due to the cutting, the cable tie head 6*a* loses its stability, which leads to the loosening of the latching of the cable tie strap 6*b* in the cable tie head 6*a*. Accordingly, the cable tie 6 is released under its destruction. In this case, however, the cable tie head 6*a* can be jammed in the cutting unit 2, so that the cable tie 6 can be removed from the bundling good by the cutting tool 1.

Figure 5:
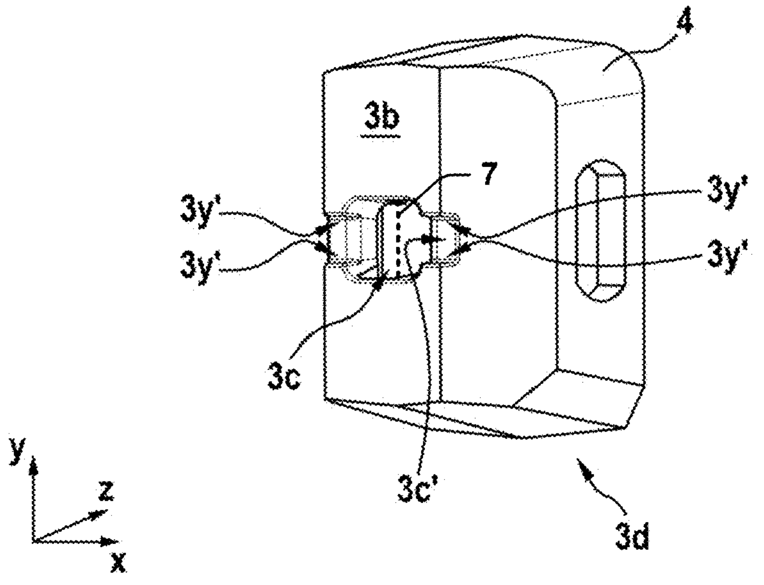
FIG. 5 shows an example tool-free exchangeable adapter element for the example aspect shown in FIGS. 1 to 4 as a perspective view.

FIG. 5 shows an adapter element 3*d* of the housing unit 3 as path-limiting unit 4 which can be replaced without tools and which, when used with the rest of the housing unit 3, defines at least a first subregion in the geometry of the receiving region 3*c*, in the present case the geometry of the receiving region 3*c* as a whole. If only the first subregion in the geometry of the receiving region is defined by the adapter element, a second subregion of the geometry of the receiving region 3*c* may be predetermined by the remaining part of the housing unit 3. Then the geometry as a whole is defined by adapter element 3*d* in interplay with the rest of the housing unit 3.

In the shown example, the geometry of the receiving region 3*c* and the distance d between end face 3*b* and blade elements 2*a*, 2*b* is depending solely on the adapter element 3*d*. Thus, a set of different adapter elements 3*d* being configured for differently shaped and/or sized cable tie heads 6*a* (e.g., via different receiving regions 3*c*) and/or predetermining different distances d (e.g., via different material thicknesses of the path-limiting unit 4 in the region of the end face 3*b*) can be used to achieve optimized removal of cable ties 6 in various different applications.

In the simplified illustration of FIG. 2, the geometry of the receiving region 3*c* corresponds to a rectangle with rounded corners whose dimensions are adapted to the cable tie head 6*a* of the respective design.

Figure 6:
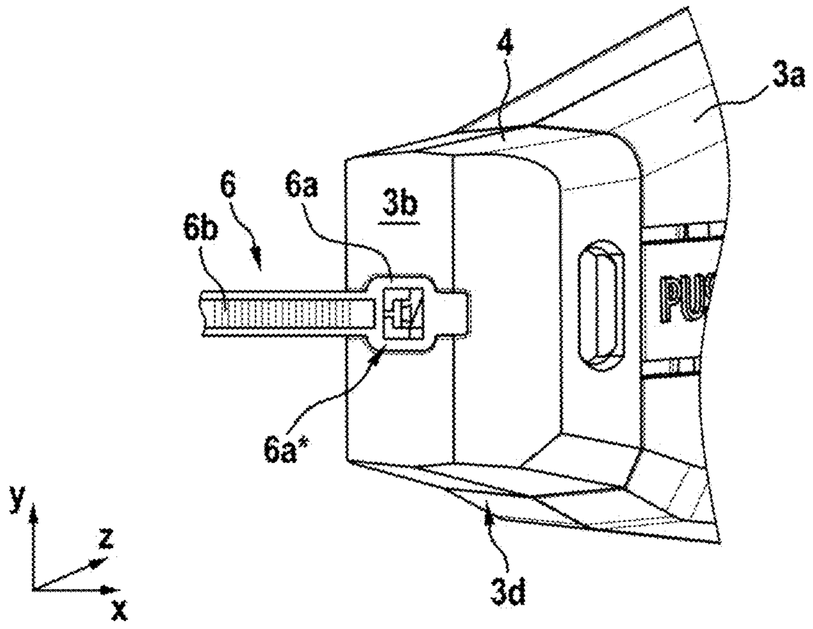
FIG. 6 shows the exchangeable adapter element of FIG. 5 while being mounted and having received a cable tie in its receiving region as a perspective view.

FIG. 6 shows the exchangeable adapter element 3*d* of FIG. 5 while being mounted on the rest of the housing unit 3, in particular the handle element 3*a*, and having received a cable tie head 6*a* in its receiving region 3*c*. The blade elements 2*a*, 2*b* have respective end faces 2*a, 2*b, which run in another plane than the end face 3*b* of the housing 3, they are offset inwardly into the housing unit 3 (e.g., in the positive z-direction here). When the cutting tool 1 is placed on the cable tie 6 and/or the cable tie head 6*a* as well as the not shown bundling good, the end face 3*b* of the housing 3 and an inner side 6*a of the cable tie head 6***a* are flush, thus run in one plane, which prevents injuries of the bundling good and still causes a reliable cutting of the cable tie head 6*a*. In the present case, the bundling good runs in the y-direction, so that the cutting path through the cable tie 6 runs parallel to the main extension direction of the bundling good with the cutting path of the blade elements 2*a*, 2*b* limited by the path limiting unit 4.

Figure 7:
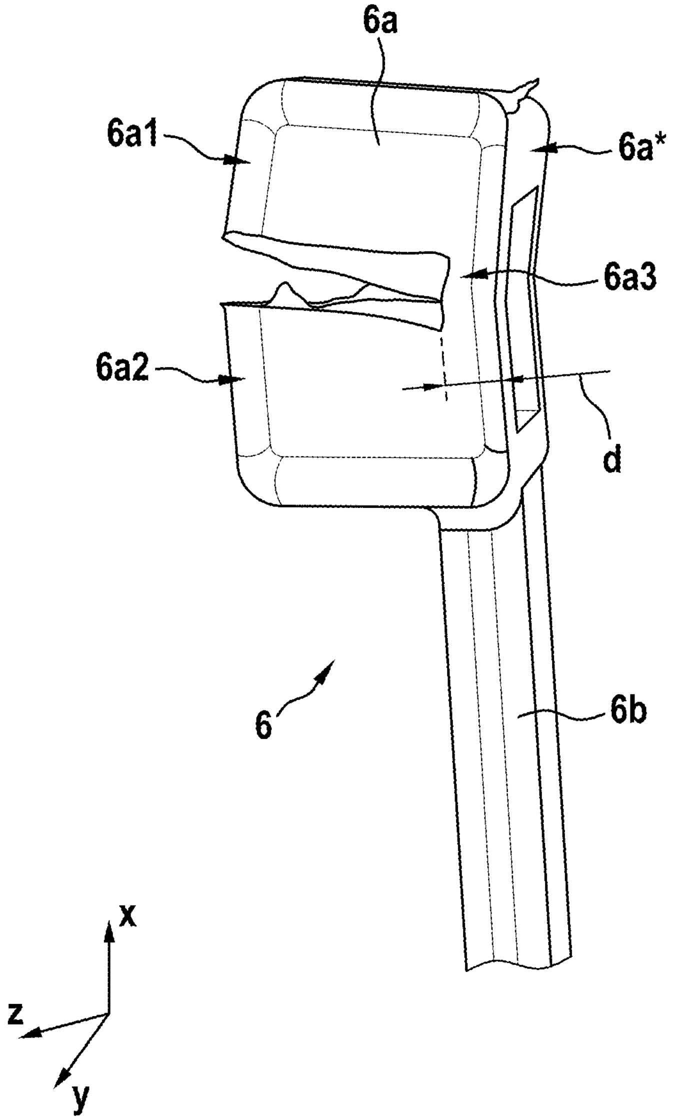
FIG. 7 shows a cable tie head cut with a path limitation as a perspective view.

FIG. 7 shows a cable tie head 6*a* cut with a path limitation. The cable tie head is cut into two parts 6*a*1, 6*a*2 which are still partially connected by a third part 6*a*3 which forms a bridge between the other two parts 6*a*1, 6*a*2. The thickness of the third part 6*a*3 (e.g., in the z-direction) corresponds to the predetermined distance d.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A cutting tool for destructively releasing a cable tie, the cutting tool comprising:

a cutting unit for cutting into the cable tie to be released;

a housing unit having a handle element for holding the cutting tool and having a housing end face to be placed on the cable tie to be loosened during intended use, the housing end face has a receiving region for a cable tie head of the cable tie to be released; and a path-limiting unit, the path-limiting unit limiting a path covered by a blade element of the cutting unit when cutting the cable tie to be released such that the cable tie is partially cut but not entirely cut through by the cutting unit, the receiving region oriented in such a way that the path covered by the blade element runs transversely to both a plane in which a closed cable tie strap of the cable tie to be released extends and a plane in which an inner side of the cable tie head extends.

2. The cutting tool according to claim 1, wherein at least one of the blade element or a further blade element has a blade end face which is arranged offset from the housing end face inwardly with a predetermined distance from the housing end face, so that the housing end face is the path-limiting unit, comprises the path-limiting unit, or is part of the path-limiting unit.

3. The cutting tool according to claim 2, wherein the predetermined distance is at least 0.5 mm.

4. The cutting tool according to claim 3, wherein the predetermined distance is at least 0.8 mm.

5. The cutting tool according to claim 1, wherein the receiving region is designed to receive the cable tie head completely.

6. The cutting tool according to claim 5, wherein the receiving region comprises a recess defined in the housing end face, the recess including at least one limiting surface configured to limit movement of the cable tie head along the plane of the housing end face in a dimension that is parallel to the path covered by the blade element during cutting.

7. The cutting tool according to claim 1, wherein the housing unit comprises an adapter element forming the path-limiting unit, which specifies a relative position of the blade element to the housing end face.

8. The cutting tool according to claim 7, wherein the relative position of the blade element to the housing end face is a predetermined distance from the housing end face to a blade end face of the blade element.

9. The cutting tool according to claim 7, wherein the adapter element is removable without tools from the cutting tool.

10. The cutting tool according to claim 7, wherein the receiving region is designed to receive the cable tie head completely, and wherein the adapter element predetermines at least a first subregion of a geometry of the receiving region.

11. The cutting tool according to claim 10, wherein the adapter element predetermines at least the geometry of the receiving region as a whole.

12. The cutting tool according to claim 1, wherein at least one of the blade element or a further blade element has a blade end face which is arranged offset from the housing end face inwardly with a predetermined distance from the housing end face, so that the housing end face is the path-limiting unit, comprises the path-limiting unit, or is part of the path-limiting unit, and the receiving region designed to receive the cable tie head completely.

13. The cutting tool according to claim 1, wherein at least one of the blade element or a further blade element has a blade end face which is arranged offset from the housing end face inwardly with a predetermined distance from the housing end face, so that the housing end face is the path-limiting unit, comprises the path-limiting unit, or is part of the path-limiting unit, and wherein the cutting unit has the further blade element which is designed to be moved counter to the blade element during cutting, the path-limiting unit also being designed to limit a path covered by the further blade element of the cutting unit during cutting of the cable tie to be released.

14. The cutting tool according to claim 1, wherein at least one of the blade element or a further blade element has a blade end face which is arranged offset from the housing end face inwardly with a predetermined distance from the housing end face, so that the housing end face is the path-limiting unit, comprises the path-limiting unit, or is part of the path-limiting unit, and wherein the housing unit comprises an adapter element forming the path-limiting unit, which specifies a relative position of the blade element or the further blade element to the housing end face.

15. A cutting tool system comprising:

a cutting tool for destructively releasing a cable tie, comprising:

a cutting unit for cutting into the cable tie to be released, the cutting unit including a blade element;

a housing unit comprising:

a handle element for holding the cutting tool;

a housing end face to be placed on the cable tie to be loosened during intended use and having a receiving region; and a plurality of different interchangeable adapter elements, each interchangeable adapter element configured to either specify a different relative position of the blade element to the housing end face or form a different geometry of the receiving region, the interchangeable adapter elements predetermine at least a first subregion of a geometry of the receiving region; and each interchangeable adapter element forming a path-limiting unit, the path-limiting unit limiting a path covered by the blade element of the cutting unit when cutting the cable tie to be released such that the cable tie is partially cut but not entirely cut through by the cutting unit.

16. The cutting tool system according to claim 15, wherein at least one of the interchangeable adapter elements forms a geometry of the receiving region alone.

17. The cutting tool system according to claim 16, wherein at least one of the interchangeable adapter elements is configured as a cap for the remaining housing unit, while forming the path-limiting unit.

18. The cutting tool system according to claim 16, wherein the path-limiting unit comprises the housing end face.

19. The cutting tool system according to claim 15, wherein the adapter element is removable without tools from the cutting tool.

20. A cutting tool for destructively releasing a cable tie, the cutting tool comprising:

a cutting unit for cutting into the cable tie to be released;

a housing unit having a handle element for holding the cutting tool and having a housing end face to be placed on the cable tie to be loosened during intended use; and a path-limiting unit, the path-limiting unit limits a first path covered by a first blade element of the cutting unit when cutting the cable tie to be released such that the cable tie is partially cut but not entirely cut through by the cutting unit, the cutting unit having a second blade element which is designed to be moved counter to the first blade element during cutting, the path-limiting unit limiting a second path covered by the second blade element of the cutting unit during cutting of the cable tie to be released.

* * * * *